US007946330B2

(12) United States Patent
Spatafora

(10) Patent No.: US 7,946,330 B2
(45) Date of Patent: May 24, 2011

(54) MACHINE AND METHOD FOR APPLYING LABELS TO PACKETS

(75) Inventor: Mario Spatafora, Granarolo (IT)

(73) Assignee: G.D Societa' per Azioni, Bologna (IT)

( * ) Notice: Subject to any disclaimer, the term of this patent is extended or adjusted under 35 U.S.C. 154(b) by 451 days.

(21) Appl. No.: 12/017,084

(22) Filed: Jan. 21, 2008

(65) Prior Publication Data

US 2008/0202681 A1 Aug. 28, 2008

(30) Foreign Application Priority Data

Feb. 27, 2007 (IT) .............................. BO2007A0129

(51) Int. Cl.
*B32B 37/12* (2006.01)

(52) U.S. Cl. ........ 156/566; 156/571; 156/475; 53/136.1

(58) Field of Classification Search .................. 156/556, 156/566, DIG. 1–DIG. 4, 571, 475; 53/136.1
See application file for complete search history.

(56) References Cited

U.S. PATENT DOCUMENTS

| | | | | |
|---|---|---|---|---|
| 3,682,743 | A | 8/1972 | Cleary et al. | |
| 4,181,561 | A * | 1/1980 | Seragnoli | 156/566 |
| 4,354,894 | A * | 10/1982 | Lewis et al. | 156/566 |
| 4,460,428 | A | 7/1984 | Teraoka et al. | |
| 4,574,027 | A | 3/1986 | Weinundbrot et al. | |
| 5,111,633 | A | 5/1992 | Draghetti et al. | |
| 5,987,850 | A * | 11/1999 | Schoch et al. | 53/136.1 |
| 6,684,606 | B1 * | 2/2004 | Draghetti | 53/136.1 |
| 6,824,614 | B1 * | 11/2004 | Spatafora | 156/578 |
| 2005/0126120 | A1 * | 6/2005 | Tale' et al. | 53/234 |

FOREIGN PATENT DOCUMENTS

| | | |
|---|---|---|
| DE | 40 40 261 | 6/1991 |
| EP | 0 034 790 | 9/1981 |
| EP | 0 114 622 | 8/1984 |
| EP | 0 335 209 | 10/1989 |
| EP | 0 393 726 | 10/1990 |
| WO | WO-93/08081 | 4/1993 |

OTHER PUBLICATIONS

European Search Report in EP 08 15 0391 dated Jun. 5, 2008.
International Search Report in PCT/EP92/02366 dated Feb. 5, 1993.

* cited by examiner

*Primary Examiner* — Khanh Nguyen
*Assistant Examiner* — John Blades
(74) *Attorney, Agent, or Firm* — Marshall, Gerstein & Borun LLP

(57) ABSTRACT

A machine for applying inland revenue stamps to packets of cigarettes, the machine having a conveying device for feeding the packets along a given path through an application station; and a feed device for feeding the stamps to the application station, and applying each stamp to a given portion of a respective packet; the feed device being movable crosswise to the travelling direction to adjust the given portion of the packet to which the stamp is applied.

16 Claims, 9 Drawing Sheets

MACHINE AND METHOD FOR APPLYING LABELS TO PACKETS

CROSS-REFERENCE TO RELATED APPLICATIONS

This application claims the benefit of Italian patent application No. BO2007A 000129, filed Feb. 27, 2007.

The present invention relates to a machine and method for applying objects to containers in the tobacco industry.

More specifically, the present invention relates to a machine for applying objects, normally labels, to containers in the tobacco industry. The machine comprises a conveying device for feeding a container in a travelling direction along a given path through an application station; and a feed device for feeding one object at a time along a feed path from a transfer station to the application station, and which comprises at least one gripping assembly for retaining the object and applying the object to a given portion of the container.

BACKGROUND OF THE INVENTION

Known machines of the type described above often comprise a gumming device located along the feed path and having one or more spray nozzles for spraying the object with adhesive.

Known machines of the type described above have the drawback of not being very versatile, and involving complicated adjustment and part changes in the event of a change in the size and/or type of container to which the object is applied. Moreover, the machines must be stopped frequently to remove fouling by the adhesive caused, for example, by off-target adhesive spray and/or the formation of so-called adhesive strands.

Machine stoppages to carry out the above jobs inevitably reduce the overall output rate of the machines.

SUMMARY OF THE INVENTION

It is an object of the present invention to provide a machine and method for applying labels to containers in the tobacco industry, designed to at least partly eliminate the drawbacks of the known art, and which, at the same time, are cheap and easy to implement.

According to the present invention, there are provided a machine and method for applying objects to containers in the tobacco industry, as claimed in the attached Claims.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
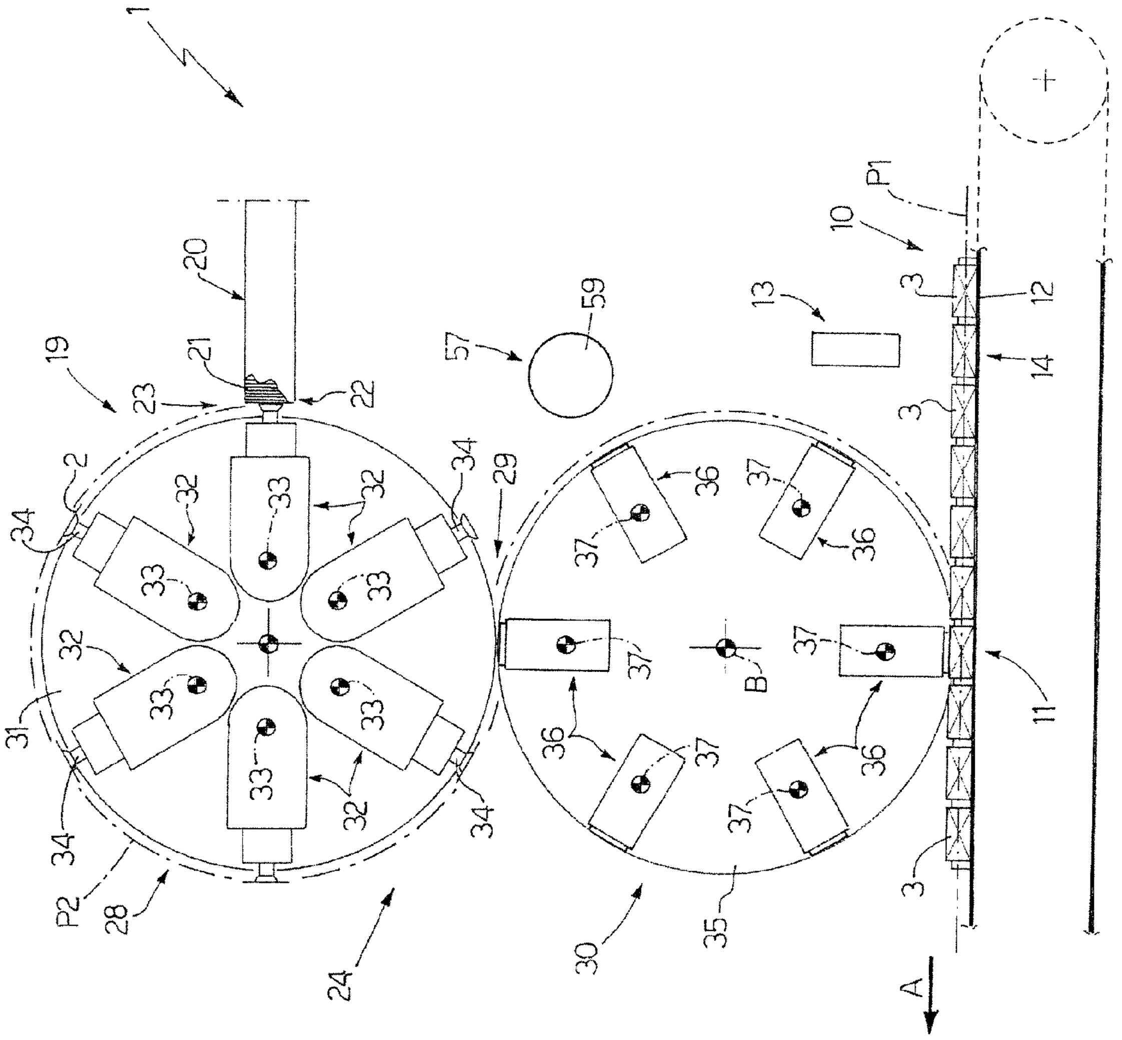
FIG. 1 shows a schematic front view of a machine for applying labels to packets in the tobacco industry, in accordance with the present invention.

Number 1 in FIG. 1 indicates as a whole a machine for applying labels 2 (in particular, inland revenue stamps) to packets 3 of cigarettes (not shown).

Figure 10:
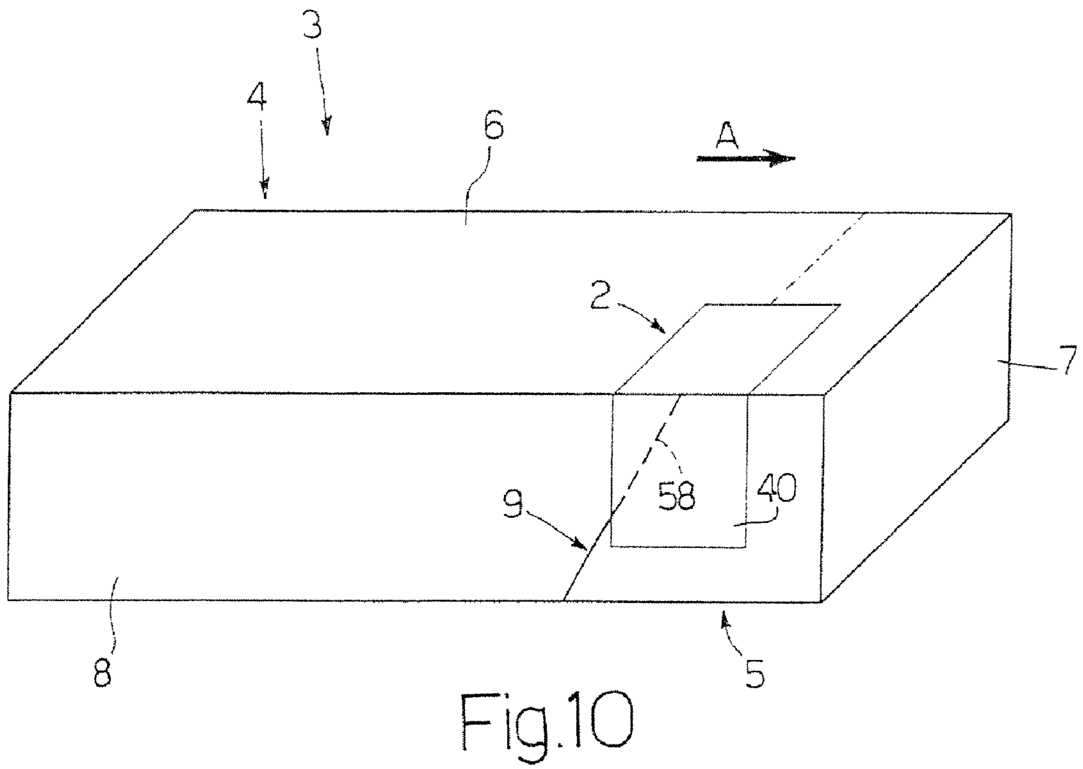
FIGS. 10 and 11 show views in perspective of packets to which a label has been applied.
Figure 11:
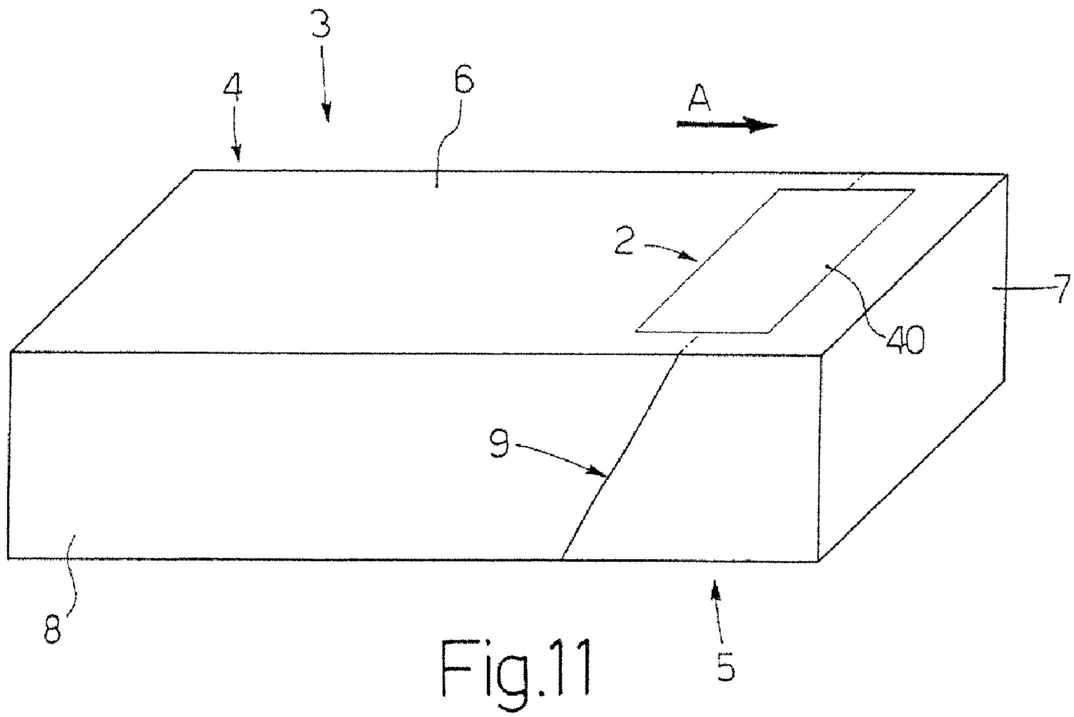

With reference to FIGS. 10 and 11, packet 3 is a rigid, hinged-lid type, and comprises a cup-shaped body 4 and a lid 5. When lid 5 is closed, packet 3 comprises a front wall (not shown); a rear wall 6; a bottom wall (not shown); a top wall 7; and two lateral walls 8 (only one shown). Lid 5 and cup-shaped body 4 are connected by a hinge (shown by a dot-and-dash line) on rear wall 6, and are separated by a parting line 9 extending across the front wall (not shown) and lateral walls 8. In FIGS. 10 and 11, packet 3 is shown as positioned on conveying device 10.

Machine 1 (FIGS. 1 and 2) comprises a conveying device 10 for feeding packets 3 horizontally in a travelling direction A along a given path P1 through an application station 11, where labels 2 are each applied to a given portion of a respective packet 3.

Figure 9:
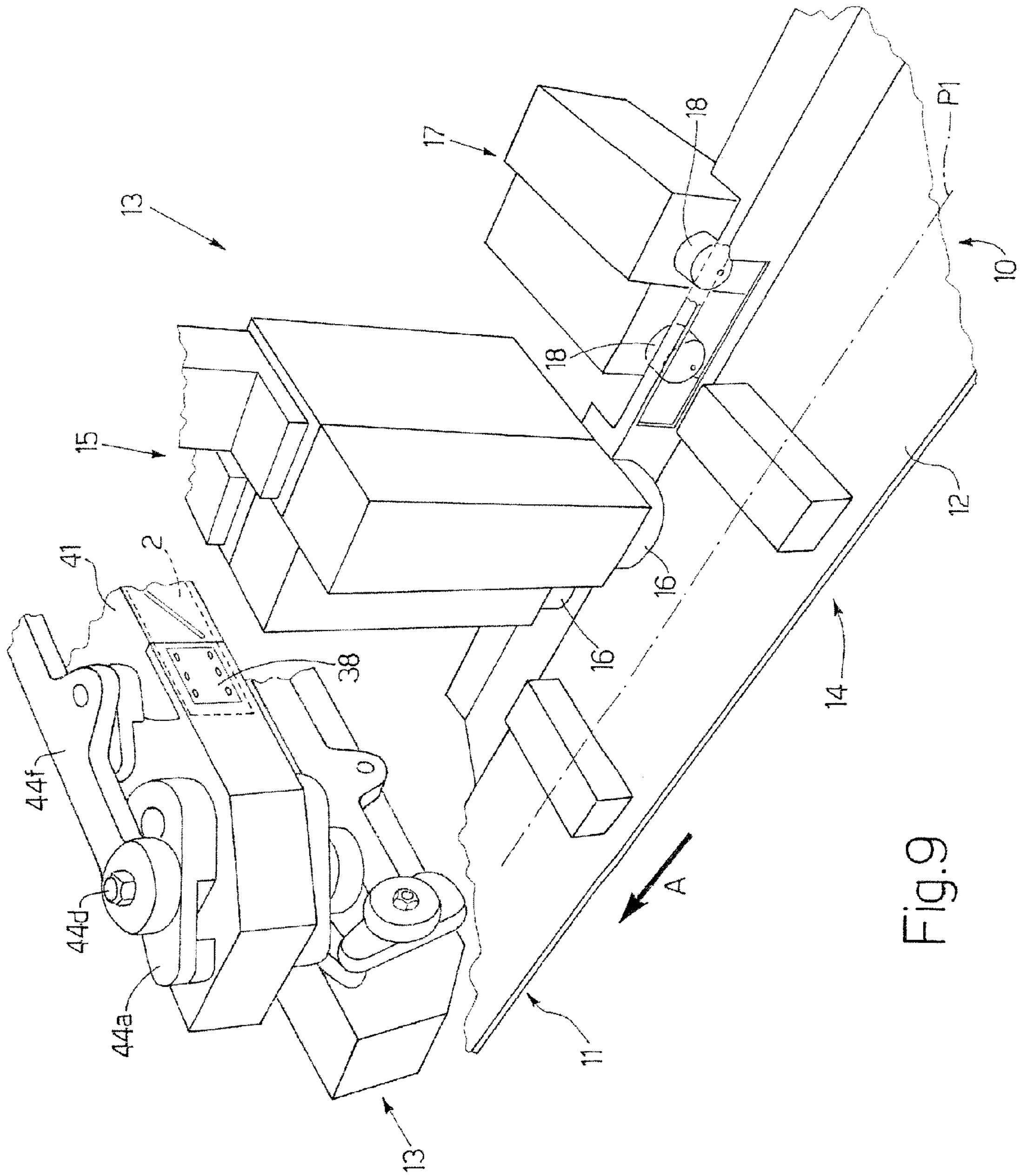
FIG. 9 shows a schematic view in perspective, with parts removed for clarity, of part of the FIG. 1 machine.

Conveying device 10 (FIG. 9) comprises a belt 12, on which are formed a number of seats, each for housing a respective packet 3.

Machine 1 also comprises a gumming device 13 located along given path P1, at a gumming station 14 upstream from application station 11, to apply adhesive to the given portion of each packet 3 to which respective label 2 is to be applied.

Gumming device 13 comprises an applicator 15 in turn comprising two spray nozzles 16, which are oriented substantially vertically downwards, and each emit two jets of adhesive onto wall 6 of each packet 3. Gumming device 13 also comprises an applicator 17 in turn comprising two spray nozzles 18, which are oriented substantially horizontally, and each emit two jets of adhesive onto one of lateral walls 8 of each packet 3.

Spray nozzles 16 are offset horizontally with respect to both the travelling direction A and a direction perpendicular to travelling direction A.

Spray nozzles 18 are offset vertically, i.e. one of spray nozzles 18 is located higher than the other.

Given the relatively large size of walls 6, 7 and 8 as compared with labels 2, there is very little likelihood of the adhesive jets missing packets 3 and fouling machine 1.

In embodiments not shown, applicator 15 and/or applicator 17 release/releases the adhesive in contact with packet 3; in which case, an actuating unit (not shown) is preferably provided at gumming station 14 to move packet 3, crosswise to travelling direction A, to and from a position contacting applicator 15 (and/or applicator 17). Alternatively, the actuating unit (not shown) moves applicator 15 (and/or applicator 17), crosswise to travelling direction A, to and from a position contacting packet 3.

In actual use, as each packet 3 travels through gumming station 14, packet 3 and applicator 15 (and/or applicator 17) are moved with respect to each other, crosswise to travelling direction A, to bring packet 3 and applicator 15 (and/or applicator 17) into contact with each other; at which point, adhesive supply is activated and then cut off. Once the adhesive supply is cut off, packet 3 and applicator 15 (and/or applicator 17) are moved with respect to each other, crosswise to travelling direction A, to detach packet 3 and applicator 15 (and/or applicator 17).

The above method provides for fast, effective cleaning of applicator 15 (and/or applicator 17), and so reducing the likelihood of adhesive strands forming and fouling the machine.

Machine 1 also comprises a feed assembly 19 for feeding labels 2 to application station 11. Feed assembly 19 comprises a substantially horizontal hopper 20 containing a stack 21 of labels 2, and having an outlet 22 at a transfer station 23; and a feed device 24, which withdraws labels 2 one at a time from outlet 22, feeds labels 2 along a feed path P2, and applies each label 2 to a respective packet 3 at application station 11.

In different embodiments not shown, machine 1 has no hopper 20, and labels 2 are cut off a strip at transfer station 23.

Figure 2:
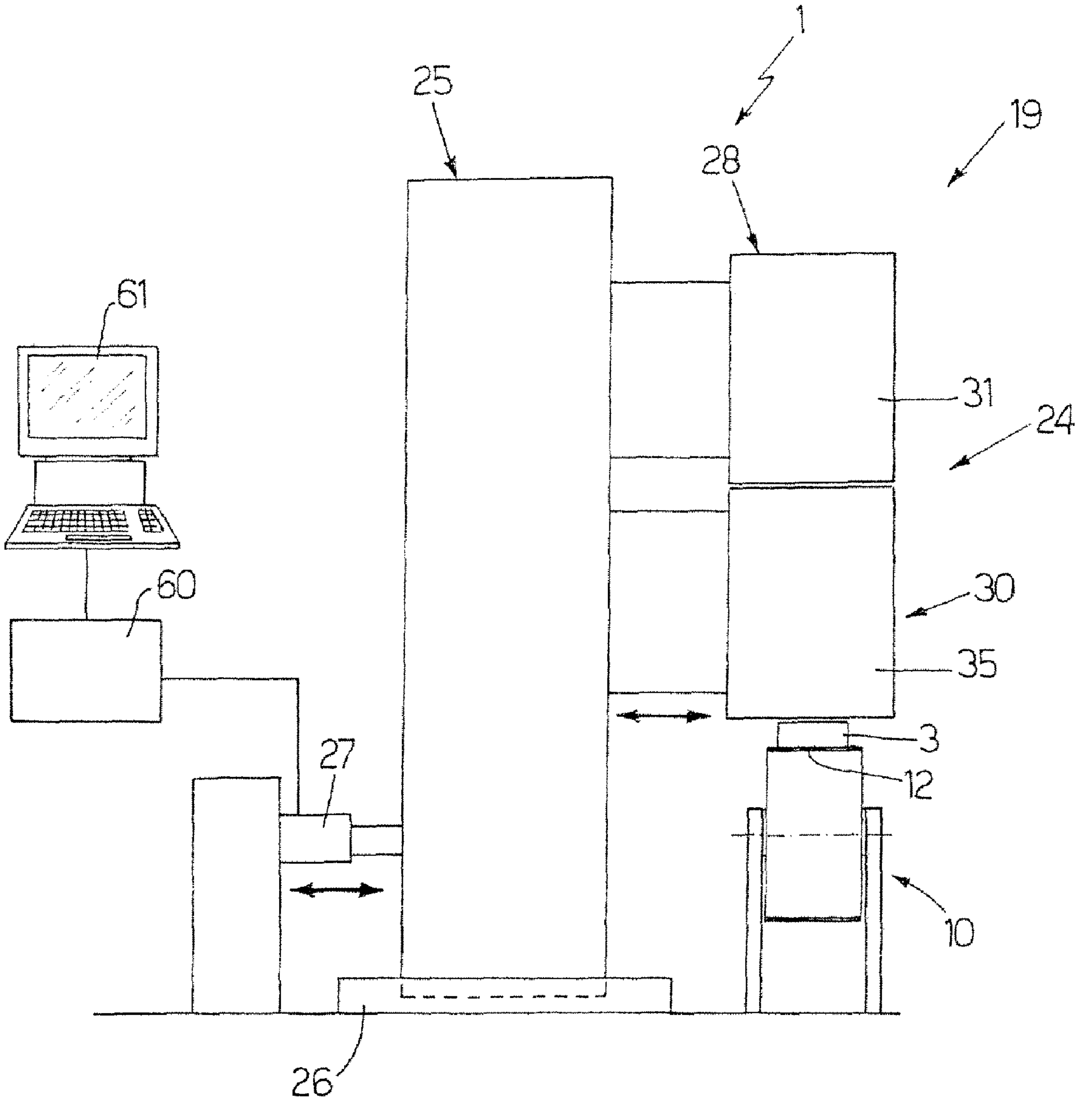
FIG. 2 shows a schematic side view of the FIG. 1 machine.

With reference to FIG. 2, feed assembly 19 comprises a frame 25, to which feed device 24, hopper 20, and gumming device 13 are fitted; guides 26 crosswise to direction A, and along which frame 25 runs in use; and a hydraulic actuator 27 for moving frame 25 crosswise, in particular, perpendicularly to direction A.

Moving feed assembly 19 crosswise to direction A provides for rapidly and effectively adjusting the portion of each packet 3 to which respective label 2 is applied.

Feed device 24 (FIGS. 1 and 2) comprises a transfer unit 28 for conveying labels 2 successively and one at a time from transfer station 23 to a transfer station 29; and an application unit 30 for conveying labels 2 from transfer station 29 to application station 11, and applying labels 2 to packets 3.

Transfer unit 28 comprises a wheel 31 having a number of—in the example shown, six—gripping assemblies 32 equally spaced along the periphery of wheel 31; and each gripping assembly 32 is mounted to oscillate about a respective axis 33, and has a suction head 34 for engaging a respective label 2 by suction at each operating cycle. In actual use, as wheel 31 rotates, gripping assemblies 32 oscillate about respective axes 33 at stations 23 and 29 to compensate for the rotation of wheel 31 and facilitate transfer of labels 2 to and from suction heads 34.

In preferred embodiments, hopper 20 and transfer unit 28 are designed as described in Italian Patent Application BO2006A000721, to which full reference is made herein.

Application unit 30 comprises a wheel 35 rotating about a respective axis B and having a number of—in the example shown, six—gripping assemblies 36 equally spaced along the periphery of wheel 35; and each gripping assembly 36 is fitted integrally to wheel 35, and has a suction head 38 for engaging a respective label 2 by suction at each operating cycle.

In alternative embodiments, each gripping assembly 36 is mounted to oscillate about a respective axis 37 substantially parallel to axis B; in which case, as wheel 35 rotates, gripping assemblies 36 oscillate about respective axes 37 at stations 29 and 11 to compensate for the rotation of wheel 35 and facilitate transfer of labels 2 to and from suction heads 38.

Figure 3:
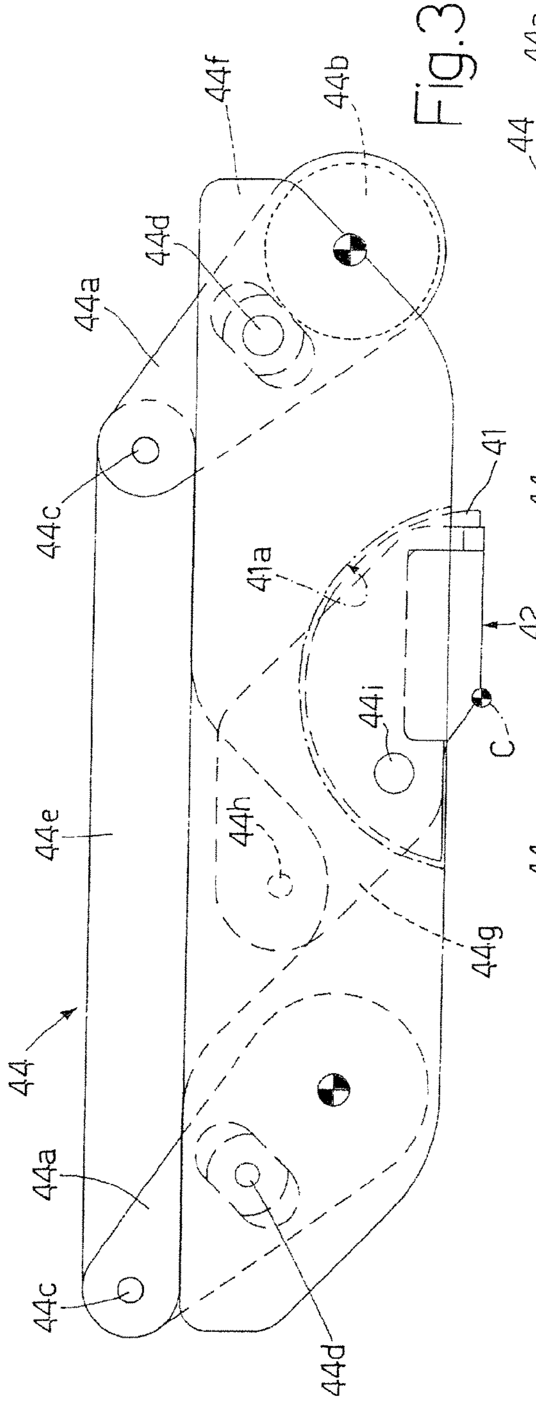
FIGS. 3 and 4 show a schematic detail of the FIG. 1 machine in two different operating positions.
Figure 4:
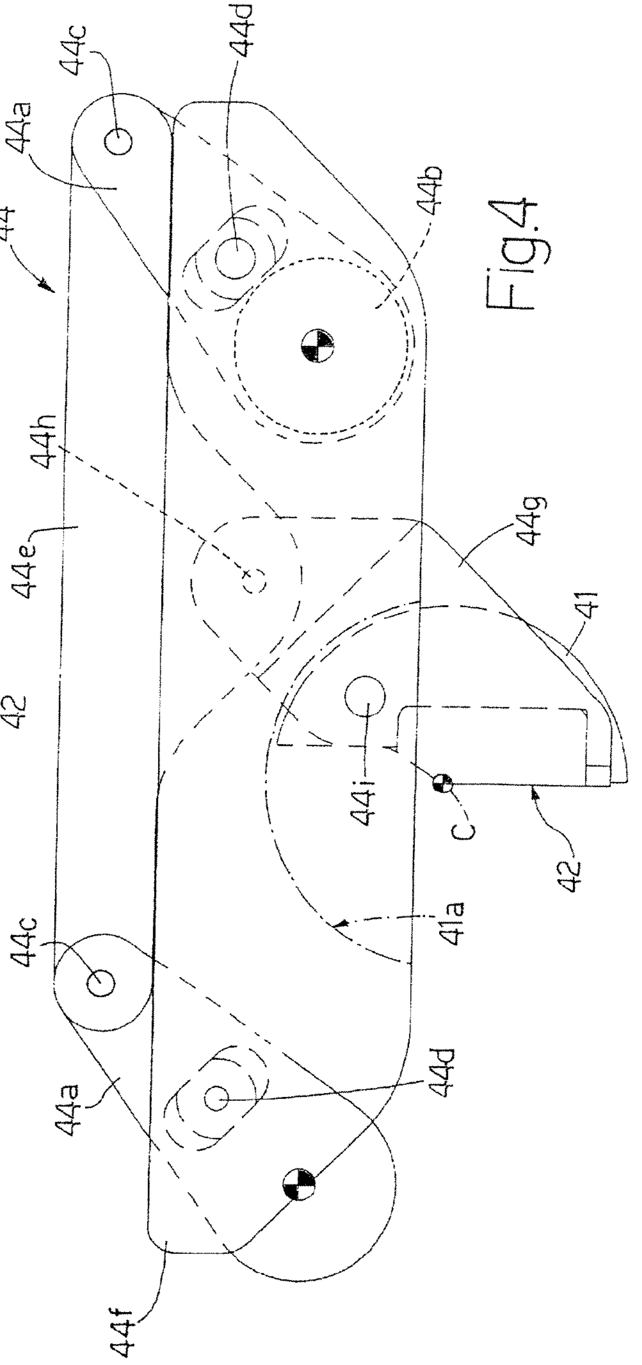
Figure 12:
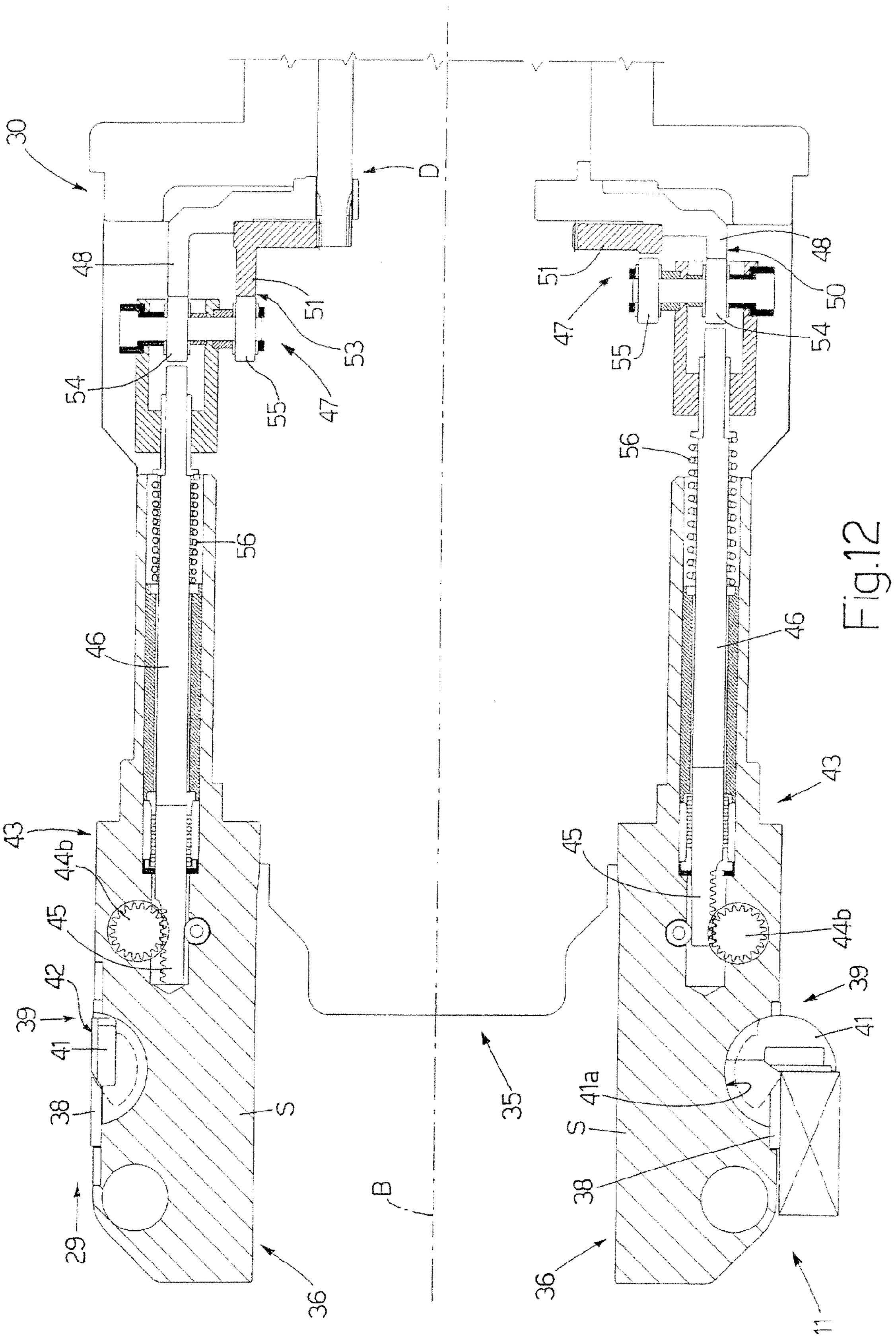
FIG. 12 shows a schematic section of a detail of the FIG. 2 machine.

With particular reference to FIGS. 3, 4 and 12, each gripping assembly 36 comprises a folding member 39 for folding a portion 40 of a relative label 2 onto the lateral wall 8 of respective packet 3 at each operating cycle, so that label 2 assumes the FIG. 10 configuration on packet 3. Each folding member 39 comprises a movable block 41, which has a flat surface 42 and is moved, in use, by an actuating device 43 of feed device 24 to rotate between a rest position (shown in FIG. 3 and in the top half of FIG. 12), in which flat surface 42 and respective suction head 38 define a supporting surface for the flat label 2 to be folded, and a work position (shown in FIG. 4 and in the bottom half of FIG. 12), in which flat surface 42 forms an angle of less than 180°, and in particular of about 90°, with respect to said supporting surface.

Actuating device 43 comprises an articulated parallelogram 44 (FIGS. 3 and 4) which links movable block 41 to a rack 45 of a transmission rod 46, so as to rotate movable block 41 about a virtual axis C.

Articulated parallelogram 44 comprises two cranks **44*a* fitted in oscillating manner to a supporting body S of gripping assembly 36; one of cranks 44*a* is integral with a gear 44*b* meshing with rack 45; and each crank 44*a* is connected in oscillating manner, by respective pins 44*c*, 44*d* to two connecting rods 44*e*, 44*f* crosswise to cranks 44*a*. Articulated parallelogram 44 also comprises a crank 44*g* connected in oscillating manner to connecting rods 44*e*, 44*f* by respective pins 44*h*, 44*i*. Crank 44*g* is integral with movable block 41, which is substantially semicylindrical and housed in a substantially semicircular seat 41*a*** formed in supporting body S.

With particular reference to FIGS. 5 to 8, actuating device 43 also comprises a cam system 47 for activating and deactivating folding member 39, and which comprises a substantially circular cam 48 having a first profile 49 with a groove 50; and a substantially circular cam 51 having a second profile 52 with a projection 53 longer than or the same length as groove 50. Cams 48 and 51 are coaxial with wheel 35, and groove 50 is located at application station 11.

Actuating device 43 also comprises a known electric motor (not shown) for rotating cam 51 about axis B via a connecting mechanism D (shown partly in FIG. 12).

Transmission rod 46 extends substantially parallel to axis B, and comprises two cam followers 54, 55 located at the opposite end of transmission rod 46 to rack 45, and which cooperate with cams 48, 51 respectively. Actuating device 43 also comprises a spring 56 coaxial with transmission rod 46, and which exerts pressure on transmission rod 46 to push cam followers 54, 55 towards cams 48, 51.

In actual use, as wheel 35 rotates about axis B, cam follower 54 runs along cam 48 to determine the position of rack 45.

Figure 5:
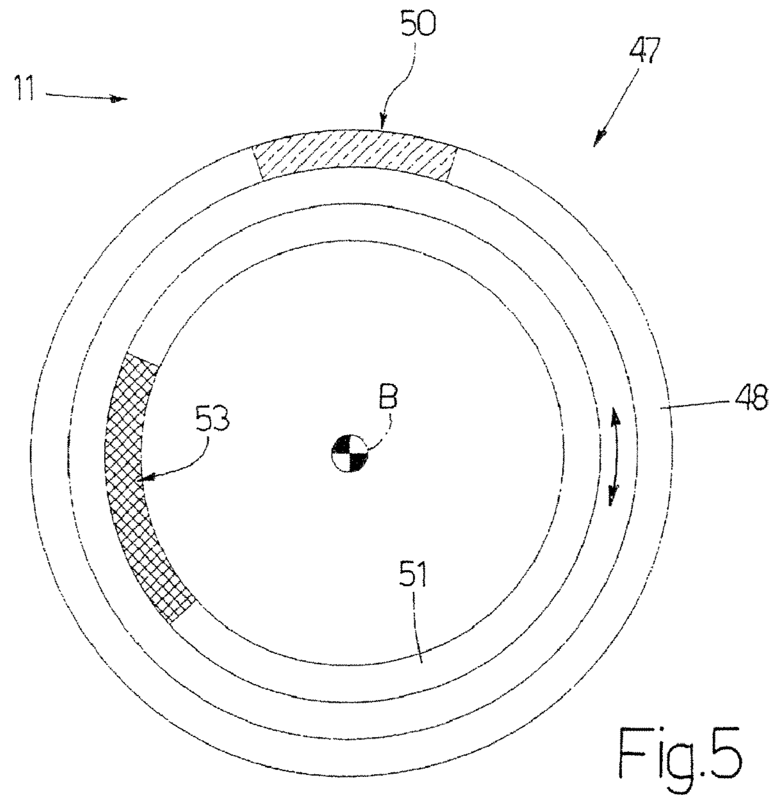
FIGS. 5 and 6 show, schematically, component parts of the FIG. 1 machine in two different operating positions.

When cams 48 and 51 are positioned with respect to each other as shown in FIG. 5, i.e. with groove 50 and projection 53 out of line, cam follower 54 engages groove 50 at application station 11 to move transmission rod 46 longitudinally. As it does so, transmission rod 46 transmits motion, via rack 45, to articulated parallelogram 44, which in turn rotates movable block 41 about virtual axis C to fold portion 40.

Figure 6:
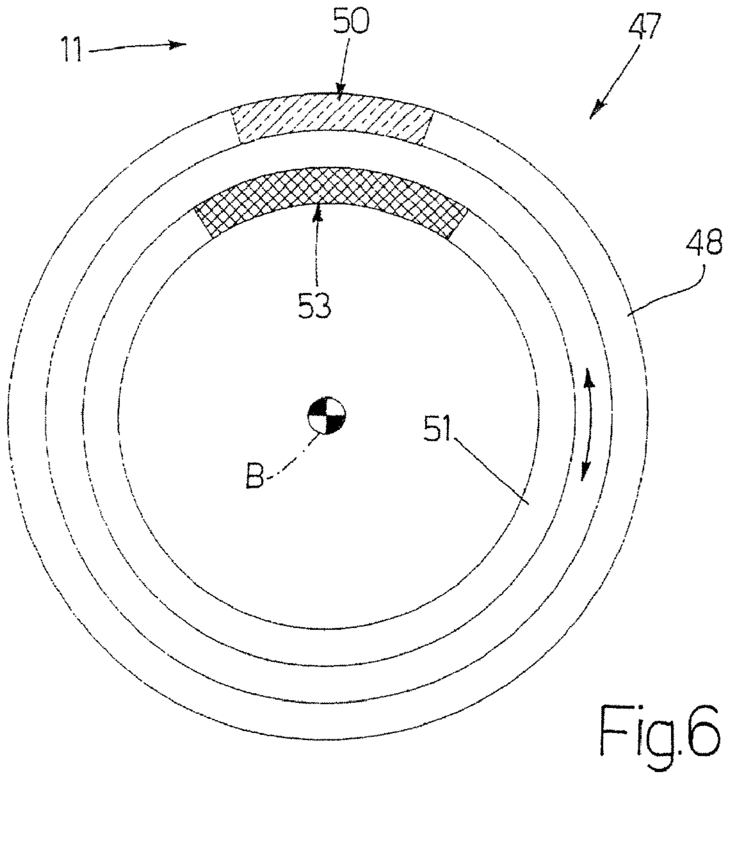
Figure 7:
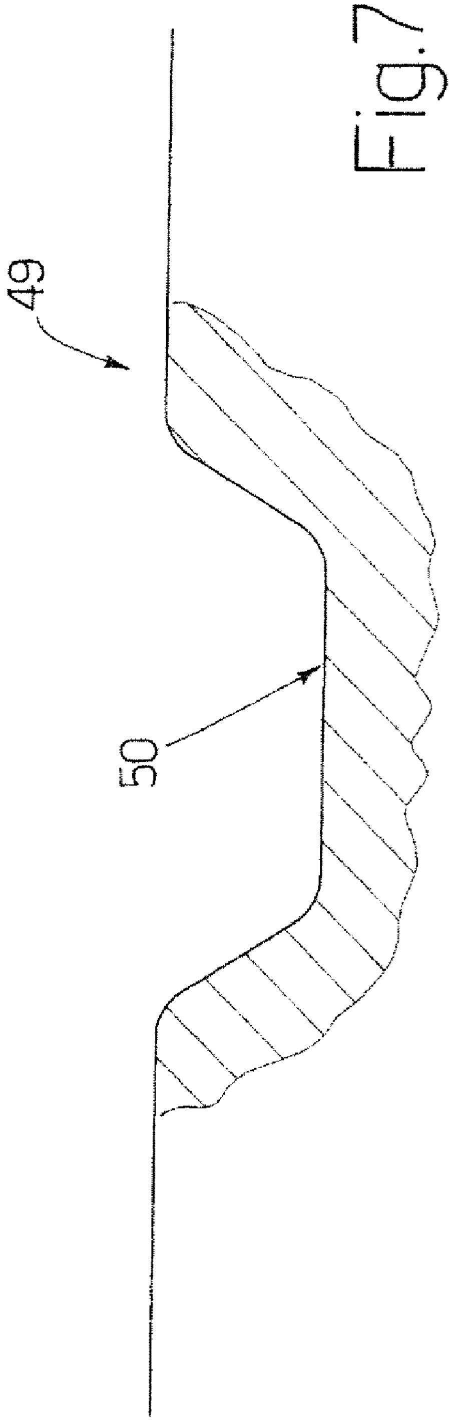
FIGS. 7 and 8 show schematic profiles of the FIGS. 5 and 6 component parts.
Figure 8:
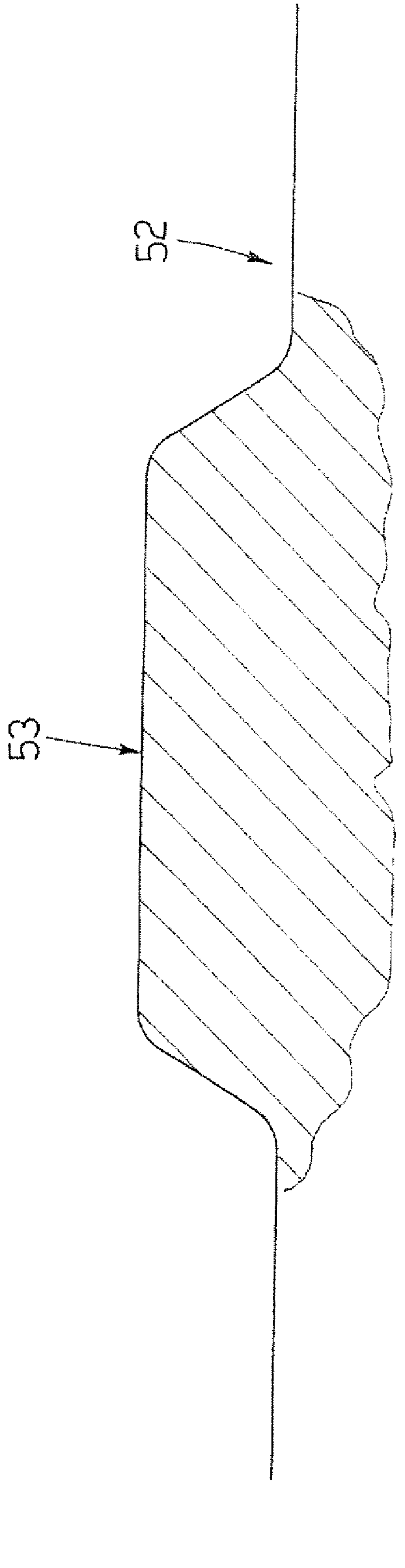

When cams 48 and 51 are positioned with respect to each other as shown in FIG. 6, i.e. with groove 50 and projection 53 in line, cam follower 55 engages projection 53 at application station 11 to prevent transmission rod 46 from moving longitudinally, and so disable folding member 39.

Machine 1 also comprises a cutting device 57 fitted to frame 25 and located along feed path P2 to form a tear line 58 in label 2. Cutting device 57 comprises a drum 59 rotating about a respective axis substantially parallel to axis B; and drum 59 is fitted with one or more known blades (not shown); the cutting device 57, in different embodiments, can be deactivated by stopping rotation of drum 59 and/or removing the blades (not shown) from drum 59.

It is important to note that application unit 30 is fitted to frame 25 by means of a known worm (not shown), which allows the operator to move application unit 30 crosswise—in particular, perpendicularly—to travelling direction A to adjust the position of wheel 35 with respect to hopper 20 and wheel 31, and hence the position of label 2 on respective suction head 38, and the point along label 2 at which it is folded.

In some embodiments, cutting device 57 is fitted integrally to frame 25, or is integral with application unit 30. In further embodiments, the position of cutting device 57 with respect to hopper 20 and wheel 31 is adjustable independently by moving cutting device 57 crosswise—in particular, perpendicularly—to direction A by means of a respective known worm (not shown) connecting the cutting device to frame 25.

In some embodiments, applicator 15 (and/or applicator 17) (FIG. 9) is fitted integrally to frame 25, or is integral with application unit 30. In further embodiments, the position of applicator 15 (and/or applicator 17) with respect to hopper 20 and wheel 31 is adjustable independently by moving applicator 15 (and/or applicator 17) crosswise—in particular, perpendicularly—to direction A by means, for example, of a respective known worm (not shown) connecting the applicator to frame 25.

Figure 13:
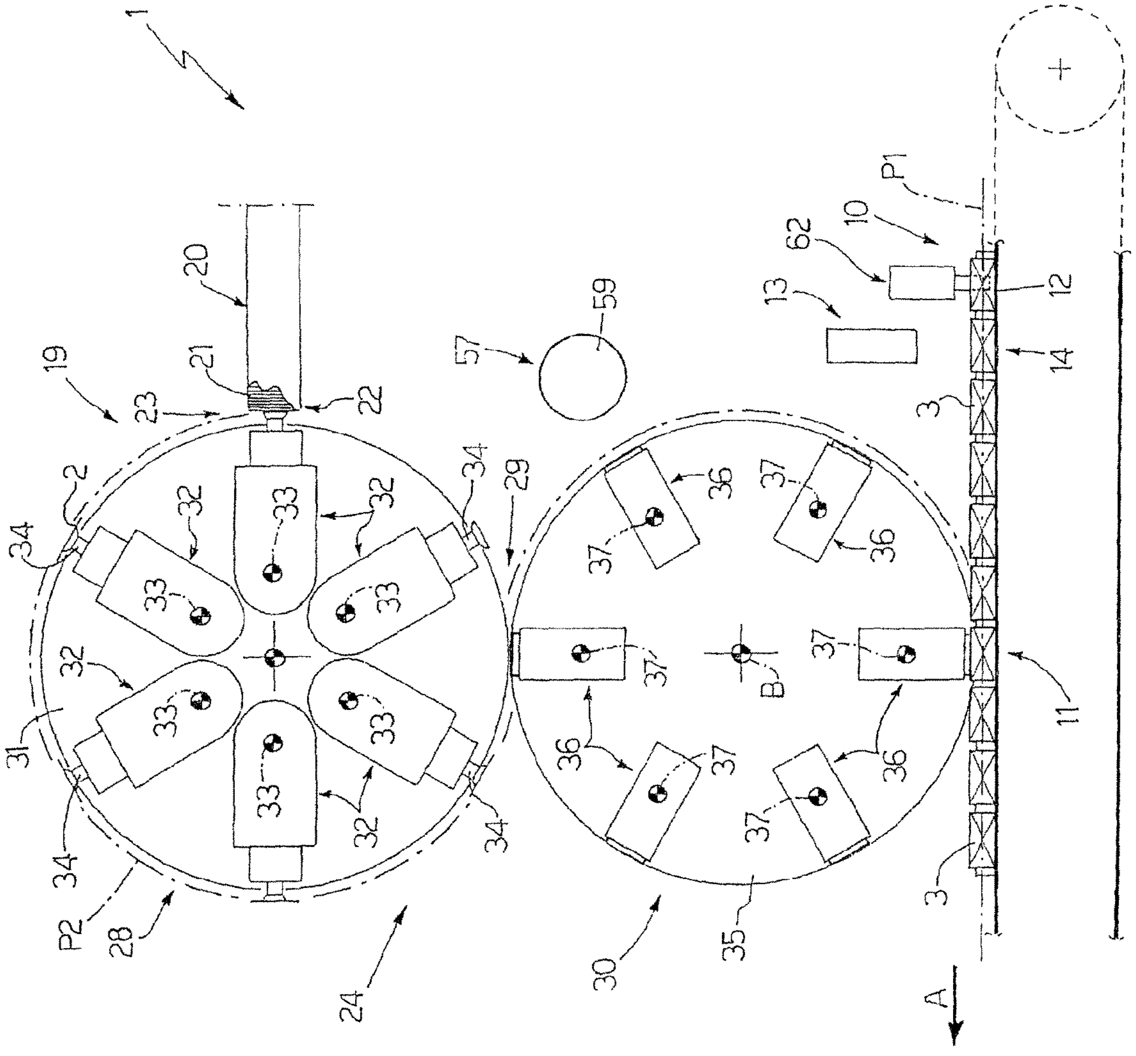
FIG. 13 shows, schematically, a variation of the FIG. 1 machine.

In the FIG. 13 variation, machine 1 is substantially identical to machine 1 described above, and differs solely by also comprising a pretreating device 62 located along given path P1, upstream from gumming device 13, and which provides for surface treating the given portion of each packet 3 to improve retention of the adhesive. More specifically, pretreating device 62 comprises a laser source for directing laser radiation onto said given portion to score and/or remove a surface layer (normally comprising plastic material and/or wax) of packet 3, and so produce a rough and/or porous given portion on packet 3.

Removing the surface layer of packet 3 reduces the likelihood of adhesive smears forming on packet 3 before, when, and/or after applying label 2.

In actual use, to switch production from a packet 3 with a folded label 2 (as shown, for example, in FIG. 10) to a packet 3 with a flat label 2 (as shown, for example, in FIG. 11), the operator enters the appropriate command in a central control unit 60 via an operator interface (Human Machine Interface—HMI) 61 (e.g. a touch screen, and/or a keyboard, and/or pushbutton panel with or without a screen).

At this point, central control unit 60 operates actuator 27 to move feed assembly 19 (in particular, feed device 24) crosswise to travelling direction A and towards conveying device 10 to adjust the portion of respective packet 3 to which each label 2 is applied.

Substantially at the same time, central control unit 60 activates the electric motor (not shown) to rotate cam 51 about axis B and align projection 53 with groove 50, thus deactivating folding members 39.

As will be clear from the above description and attached drawings, machine 1 is extremely versatile, by adjusting the position of labels 2 on respective packets 3, and switching rapidly and efficiently from production of a packet 3 with a folded label 2 (as shown, for example, in FIG. 10) to a packet 3 with a flat label 2 (as shown, for example, in FIG. 11), and vice versa, thus minimizing labour time and downtime of machine 1.

Though the above description and attached drawings refer to a conventional hinged-lid packet 3, the teachings of the present invention obviously also apply to any type of packet in the tobacco industry, such as a "soft" pack of cigarettes.

In alternative embodiments not shown, some of the longitudinal edges and/or transverse edges of packet 3 may be non-square rounded or bevelled edges. For example, the longitudinal edges may be non-square rounded or bevelled edges, or (as in the packet of cigarettes described in Patent Application EP-A1-0764595) the major transverse edges may be non-square rounded or bevelled edges. Alternatively, some longitudinal edges and transverse edges may be non-square, so as to have non-square rounded or bevelled longitudinal and transverse edges.

In a different embodiment not shown, packet 3 may resemble the packet of cigarettes described in Patent Application EP-A1-1066206; in which case, the front wall and/or rear wall 6 are/is outwardly convex, with a flat central portion and two curved creased lateral bands.

The teachings of the present invention obviously also apply to the manufacture of cartons of cigarettes.

The invention claimed is:

1. A machine for applying labels (2) to containers (3) in the tobacco industry, machine (1) comprising:

a conveying device (10) for feeding a container (3) in a traveling direction (A) along a given path (P1) through an application station (11); and a feed assembly (19) for feeding one label (2) at a time along a feed path (P2) from a transfer station (23; 27) to the application station (11), and which comprises at least one gripping assembly (36) for retaining the label (2) and applying the label (2) to a given portion of the container (3) at the application station (11), the feed assembly (19) being movable crosswise to the traveling direction (A) to adjust the given portion of the container (3) to which the label (2) is applied, the feed assembly (19) comprising a store (20) of labels (2), and an application unit (30) for applying the label (2) to the container (3); the application unit (30) and the store (20) being movable with respect to each other crosswise to said traveling direction (A) and to said feed path (P2).

2. A machine as claimed in claim 1, wherein the gripping assembly (36) comprises at least a folding member (39) for folding a portion (40) of the relative label (2) at the application station (11).

3. A machine as claimed in claim 2, wherein the folding member (39) comprises a movable block (41) having a flat surface (42); and the feed assembly (19) comprises at least an actuating device (43) for moving the movable block (41) to rotate the movable block (41) between a rest position, in which the flat surface (42) defines a supporting surface for the flat label (2) to be folded, and a work position, in which the flat surface (42) forms an angle of less than 180° with the supporting surface.

4. A machine as claimed in claim 3, wherein the actuating device (43) comprises a cam system (47) for activating and deactivating the folding member (39).

5. A machine as claimed in claim 4, wherein the cam system (47) comprises a first cam (48) having a first profile (49) with a groove (50); a second cam (51) having a second profile (52) with a projection (53) longer than or the same length as the groove (50); a transmission member (46) for transmitting motion to the movable block (41), and which has a first and second cam follower (54, 55) cooperating with the first and second cam (48, 51) respectively; and contrasting means for pushing the first and second cam follower (54, 55) towards the first and second cam (48, 51) respectively; the first and second cam (48, 51) are movable with respect to each other; and the folding member (39) is deactivated when the projection (53) is aligned with the groove (50) so that the first cam follower (54) does not engage the groove (50).

6. A machine as claimed in claim 5, wherein the feed assembly (19) comprises a wheel (35) rotating about a respective axis (B); the first and second cam (48, 51) are substantially circular and coaxial with the wheel (35); and the feed assembly (19) comprises actuating means to rotate the second cam (51) about the axis (B).

7. A machine as claimed in claim 3, wherein the actuating device (43) comprises a motion transmission member (46); and an articulated parallelogram (44) linking the transmission member (46) to the movable block (41), and designed to rotate the movable block (41) about a virtual axis (C).

8. A machine as claimed in claim 1, and comprising an actuator (27) for moving the feed assembly (19) crosswise to said traveling direction (A).

9. A machine as claimed in claim 1, wherein the feed assembly (19) comprises a feed device (24) for withdrawing one label (2) at a time from the store (20), and feeding the label (2) to the application station (11).

10. A machine as claimed in claim 1, wherein the feed device (24) comprises a transfer unit (28) located between the store (20) and the application unit (30) to withdraw the label (2) from the store (20) and feed the label (2) to the application unit (30).

11. A machine as claimed in claim 1, and comprising a cutting device (57) located along the feed path (P2) to form a tear line (58) on the label (2); the cutting device (57) being deactivatable.

12. A machine as claimed in claim 11, and comprising a gumming device (13) located along the given path (P1), upstream from the application station (11), to apply adhesive to the given portion of the container (3).

13. A machine as claimed in claim 12, wherein the gumming device (13) comprises at least one applicator (15; 17) which releases adhesive in contact with the container (3).

14. A machine as claimed in claim 13, and comprising an actuating unit for moving the container (3) and the applicator (15; 17) with respect to each other, crosswise to the traveling direction (A), so that the applicator (15; 17) and the container (3) are brought to and from a position contacting each other.

15. A machine as claimed in claim 2, wherein the folding member (39) is deactivatable.

16. A machine as claimed in claim 1, wherein the application unit (30) comprises a suction head (38) for engaging the label (2); the application unit (30) and the store (20), being movable with respect to each other crosswise to said traveling direction (A) so as to adjust the position of the label (2) on the suction head (38).

* * * * *